United States Patent [19]

Imagawa

[11] Patent Number: 5,829,625
[45] Date of Patent: Nov. 3, 1998

[54] FRP DOUBLE-WALL TANK AND PRODUCING METHOD THEREFOR

[75] Inventor: Masahiro Imagawa, Bisai, Japan

[73] Assignee: Imaharu Kasei Co., LTD, Japan

[21] Appl. No.: 707,136

[22] Filed: Sep. 3, 1996

[30] Foreign Application Priority Data

Sep. 4, 1995 [JP] Japan .................................. 7-009338
Jul. 25, 1996 [JP] Japan .................................. 8-196103

[51] Int. Cl.$^6$ .................................................. B65D 90/02
[52] U.S. Cl. .................................. 220/567.1; 220/567.2; 220/918; 220/62.19; 220/62.22
[58] Field of Search .................................. 220/445, 447, 220/441, 442, 443, 565, 426, 428, 469, 464, 918, 919, 62.11, 62.18, 62.19, 62.22, 567.1, 567.2

[56] References Cited

U.S. PATENT DOCUMENTS

| | | | |
|---|---|---|---|
| 3,066,822 | 12/1962 | Watter | 220/441 |
| 3,142,599 | 7/1964 | Chavannes | 220/445 |
| 4,561,292 | 12/1985 | Pugnale et al. | |
| 4,780,946 | 11/1988 | Palazzo | 220/445 |
| 4,927,050 | 5/1990 | Palazzo | 220/445 |
| 4,936,705 | 6/1990 | Schneider | |
| 5,224,621 | 7/1993 | Cannan, Jr. et al. | 220/445 |
| 5,269,436 | 12/1993 | Bachmann | 220/445 |

FOREIGN PATENT DOCUMENTS 465 498  12/1968  Switzerland .

OTHER PUBLICATIONS

Hayakawa, Committee Report 2: Safe Measurement Examination Committee on Tanks To Be Buried Underground; FRP Double–Wall Tank, Reinforced Plastics, Vol. 42, No. 2, 1996, pp. 22–26, Japan.

*Primary Examiner*—Stephen J. Catellano

[57] ABSTRACT

The invention aims to provide a FRP double-wall tank and a producing method therefor which can provide improved productivity and cost efficiency, the FRP double-wall tank comprising an inside wall of reinforced plastics and an outside wall of reinforced plastics covering said inside wall, and further comprising a sheet having cavities interposed between said inside wall and said outside wall and a film interposed between said sheet and said outside wall.

4 Claims, 5 Drawing Sheets

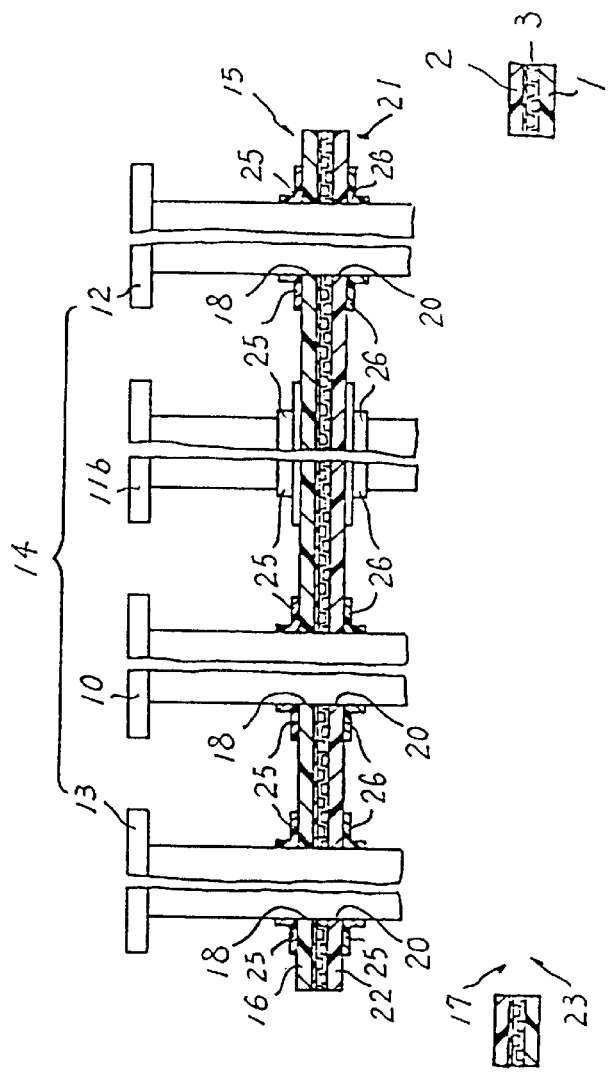
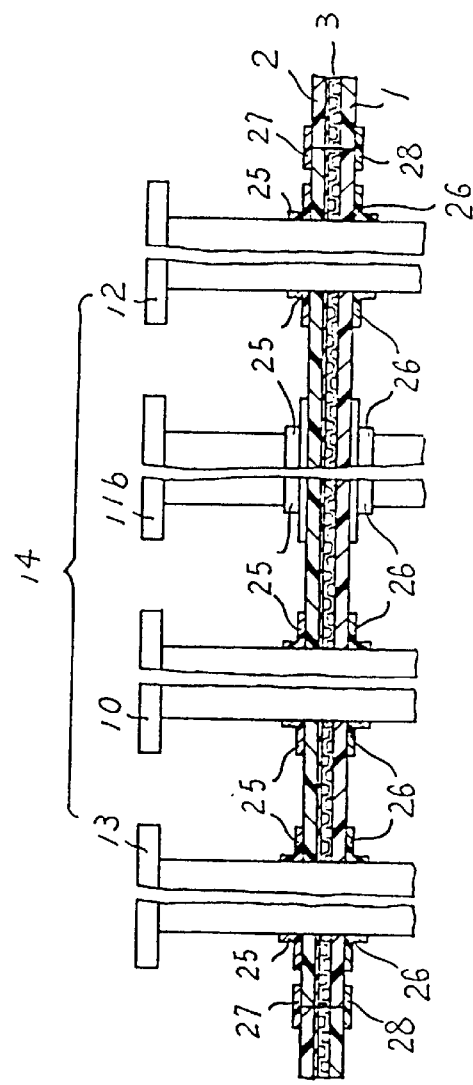
Fig. 9
Fig. 10

FRP DOUBLE-WALL TANK AND PRODUCING METHOD THEREFOR

BACKGROUND OF THE INVENTION

1. Field of the Invention

This invention relates to a FRP double-wall tank, and more particularly, to a FRP Double-wall tank suitable for a tank to be buried underground, and a producing method therefor.

2. Description of the Background Arts

Steel tanks have been generally used for an oil tank to be buried underground. When the steel tank is used with buried underground for a long time, the outside wall is subject to corrosion by acid solid from outside and the inside wall is subject to corrosion by impurities like water in the oil from inside. This causes a problem that a pin-hole is created in the tank walls and dangerous substance like oil leaks.

To solve this problem, attention has been paid to fiberglass reinforced plastics (FRP) having good anti-corrosion properties and sufficient strength, and double-wall tanks of steel and FRP (hereinafter referred to SF double-wall tank) have been proposed and are now in common use. The SF double-wall tank comprises an inside wall of steel and an outside wall of FRP spaced out from the inside wall to cover it, so that room for detecting leakage of dangerous substances can be formed around the outer periphery of the inside wall.

However, even the SF double-wall tank does not have a sufficient corrosion resistance because the inside wall is corroded in a long use, so that a pin-hole perforation in the inside wall is created.

This led to a study on a realization of FRP double-wall tank whose outside wall and inside wall are both made of fiberglass reinforced plastics.

However, the material of FRP of the FRP double-wall tank is higher in costs than steel. Also, it is hard to make a double-wall structure by use of FRP to form the dangerous substance leakage detecting room with efficiency, so that the FRP double-wall tank is poor in productivity and cannot be made at the same costs as the SF double-wall tank.

SUMMARY OF THE INVENTION

The invention aims to produce the FRP double-wall tank in an efficient manner to improve productivity and thereby provide a FRP double-wall tank of cost efficiency.

According to the invention, the FRP double-wall tank comprises an inside wall of fiberglass reinforced plastics, an outside wall of fiberglass reinforced plastics covering the inside wall, a sheet with cavities interposed between the inside wall and the outside wall, and a film interposed between the sheet and the outside wall.

The sheet with cavities interposed between the inside wall and the outside wall can ensure the room for detecting leakage of dangerous substances in a simple and efficient manner. Also, the film interposed between the sheet and the outside wall can prevent resins entering the room when the outside wall is molded. This can provide the result that the FRP double-tank can be produced efficiently, and the productivity and cost-effectiveness can be improved.

Preferably, openings at the cavities of the sheet are directed toward the outside wall so that the openings at the cavities can be covered with the film.

This can prevent resins entering the cavities of the sheet when the outside wall is molded and also can ensure a uniformed thickness of the outside wall, and thereby an amount of resins used can be saved to reduce manufacturing costs further. Besides, the film interposed prevents the sheet and the outside wall being adhered directly to each other, and thus, when the outside wall is damaged, leakage of oil can be found promptly.

Instead of the sheet and the film, a plurality of spacers comprising a sheet having cavities whose openings are directed toward the outside wall and a film covering the openings at the cavities of the sheet and stuck to the sheet may be interposed between the inside wall and the outside wall.

In this embodiment, the spacers simply disposed around the outer periphery of the inside wall can ensure the room for detecting leakage of dangerous substance and also mold the outside wall at the time of producing the FRP double-wall tank. Thus, improved workability and productivity can be achieved, in comparison with the embodiment where the sheet and the film are respectively interposed between the inside wall and the outside wall, so that the FRP double-wall tank can be provided at reduced manufacturing costs.

Desirably, the spacers are provided at the marginal portions thereof with overlapping margins for allowing adjacent spacers to overlap with each other.

The provision of the overlapping margins, at which adjacent spacers are overlapped with each other, can prevent gaps being created between the adjacent spacers to surely prevent resins entering the room for detecting leakage of dangerous substance when the outside wall is molded.

Thus, the FRP double-wall tank of the invention is particularly suitable for use to a tank to be buried underground which is requested to corrosion resistance.

The invention is also directed to a method for producing the FRP double-wall tank comprising steps of: molding the inside wall of fiberglass reinforced plastics; disposing the sheet with cavities on the inside wall so as to cover the inside wall with the sheet; disposing the film on the sheet so as to cover the sheet with the film; and molding the outside wall of fiberglass reinforced plastics so as to cover the film with the outside wall.

Disposing the sheet with cavities on the inside wall can provide the room for detecting leakage of dangerous substance in a simple and effective manner, while also disposing the film on the sheet can prevent resins entering said the room in the process of molding the outside wall. Thus, the FRP double-wall tank can be made with efficiency to provide improved productivity and cost efficiency.

In place of the sheet and the film, a plurality of spacers, each comprising a sheet having cavities whose openings are directed toward the outside wall and a film covering the openings at the cavities of the sheet and stuck to the sheet, may be used so that the inside wall can be covered with the spacers and the outside wall can be molded on the films of the spacers.

In this process, simply disposing the spacers on the outer periphery of the inside wall can ensure the room for detecting leakage of dangerous substance, while also the outside wall can be molded on the spacers. Thus, improved workability and productivity can be achieved, in comparison with the process of interposing the sheet and the film between the inside wall and the outside wall, respectively, so that a FRP double-wall tank can be provided at reduced manufacturing costs.

Desirably, the spacers are provided at the marginal portions thereof with overlapping margins for allowing adjacent spacers to overlap with each other, so that, in the process of covering the inside wall with the spacers, the adjacent spacers are overlapped with each other at the marginal portions.

Overlapping adjacent spacers with each other at the overlapping margins can prevent gaps being created between the adjacent spacers to surely prevent resins entering the room for detecting leakage of dangerous substance in the process of molding the outside wall.

BRIEF DESCRIPTION OF THE DRAWINGS

FIG. 9 shows a partial section view of cutout plates of the outside and inside walls through which nozzles are perforated;

FIG. 10 shows a partial section view of the FRP double-wall tank showing that the cutout plate of the outside wall and the cutout plate of the inside wall are restored to the outside wall and the inside wall, respectively;

DETAILED DESCRIPTION OF PREFERRED EMBODIMENTS

Figure 1:
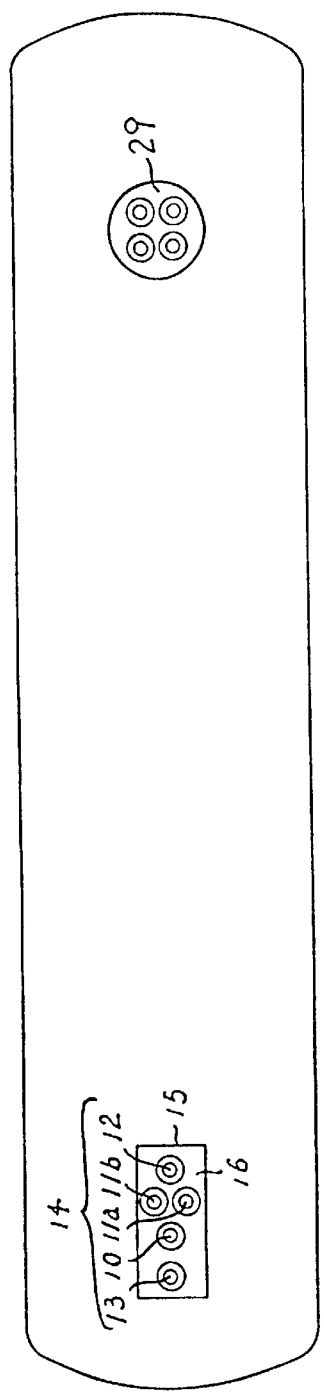
FIG. 1 is a plan view of one embodiment of the FRP double-wall tank of the invention.
Figure 2:
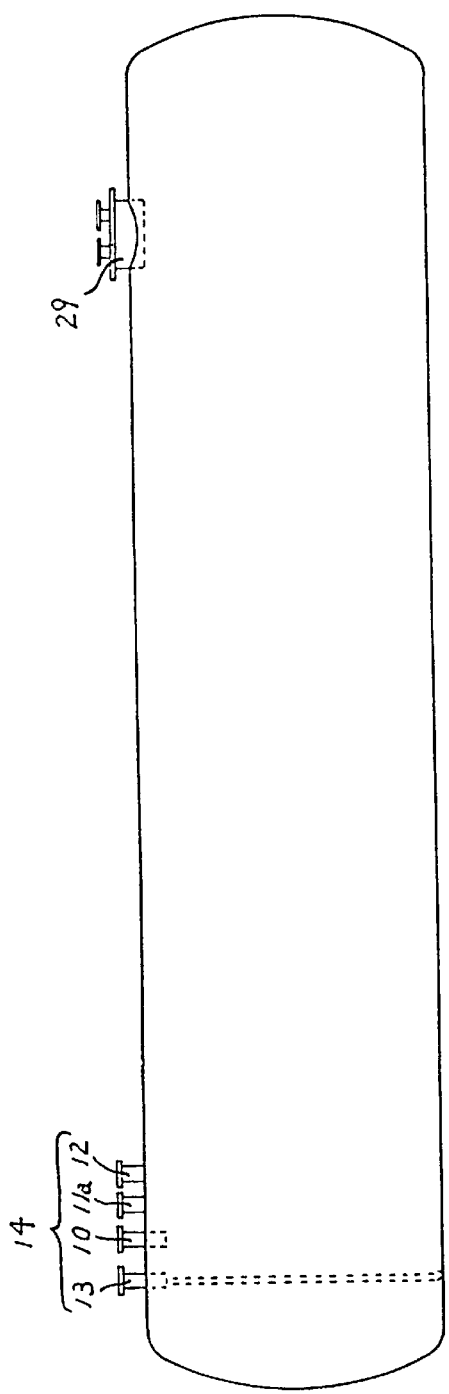
FIG. 2 is a side view of the FRP double-wall tank shown in FIG. 1.

FIG. 1 shows a plan view of one embodiment of the FRP double-wall tank of the invention and FIG. 2 is a side view of the FRP double-wall tank shown in FIG. 1.

The FRP double-wall shown in FIGS. 1 and 2 is a tank to be buried underground to store dangerous substances like flammable liquids such as gasoline. The tank has a cylindrical shape, with its axis extending horizontally. On an upper surface on the left side of the tank are disposed several kinds of nozzles 14 including an oiling nozzle 10, a ventilating nozzle 11a, a fueling nozzle 11b, an oil-level gauging nozzle 12, and a detecting nozzle 13. On an upper surface on the right side of the tank is disposed a manhole 29 through which a worker can go into the tank.

Figure 3:
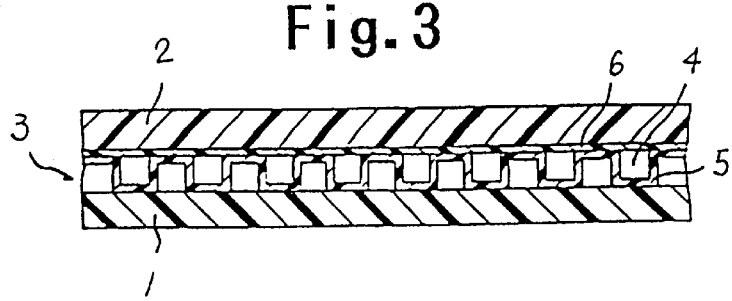
FIG. 3 shows a partial section view of the FRP double-wall tank shown in FIG. 1.

The FRP double-wall tank comprises an inside wall 1 of reinforced plastics and an outside wall 2 of reinforced plastics spaced at a predetermined interval from the inside wall 1 so as to cover the inside wall 1. Between the inside wall 1 and the outside wall 2 is interposed a sheet 5 with cavities and between the sheet 5 and the outside wall 2 is interposed a film 6, as shown in FIG. 3 showing a section of the tank.

More specifically, the cavities 4 at the sheet 5 are spaced from each other at predetermined intervals so that intervals between the cavities 4,4 can define room for detecting leakage of dangerous substances. Preferably, the sheet 5 is pre-formed in curves so as to have a curvature extending along a periphery of the inside wall 1.

Figure 4:
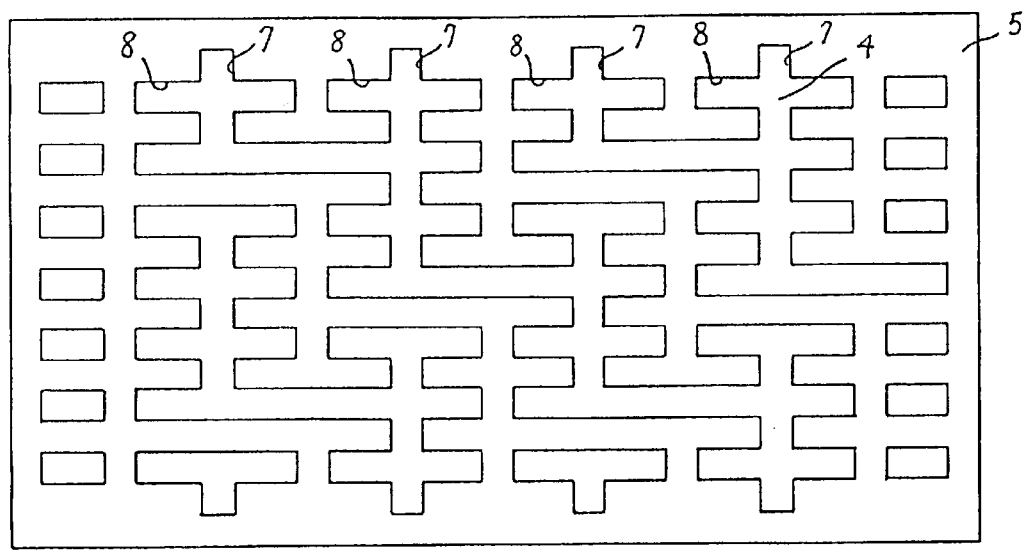
FIG. 4 shows a plan view of a spacer to be interposed between the inside wall and the outside wall.

The cavities 4 may be formed into any shapes, e.g., a circular shape, a square shape, etc. Preferably, the cavities comprises vertical grooves 7 and horizontal grooves 8 intersecting at right angles to define cross-shaped grooves and T-shaped grooves which are connected so successively as to efficiently ensure the passages for a dangerous substance leaking in any part of the inside wall to flow up to a detecting sensor 80 discussed later, as shown in FIG. 4.

Further, in order to detect the dangerous substance leakage promptly, it is preferable that the sheet 5 is formed to have a height of the order 3–5 mm so as not to broaden the space between adjacent cavities 4 too much and a thickness of the order of 0.4–1.2 mm allowing for pressure-resistance strength.

As shown in FIG. 3, the sheet 5 is interposed such that openings at the cavities 4 are directed toward the outside wall 2 and the film 6 is interposed between the sheet 5 and the outside wall 2 so as to cover the openings at the cavities 4.

Thus, the cavities 4 at the sheet 5 interposed between the inside wall 1 and the outside wall 2 enable spaces defined between adjacent cavities 4 to be used as room for detecting leakage of dangerous substance, and thus the dangerous-substance-leakage-detecting room can be provided in a simple and efficient manner. Also, the film 6 interposed between the sheet 5 and the outside wall 2 can prevent resins entering the room when the outside wall 2 is molded. This can provide the result that the FRP double-wall tank can be produced efficiently and the productivity and cost-effectiveness can be improved.

Where the openings at the cavities 4 of the sheet 5 are directed toward the outside wall 2 and are covered with the film 6, as shown in FIG. 3, resins are prevented from entering the cavities 4 of the sheet 5 when the outside wall 2 is molded and also a uniformed thickness of the outside wall 2 is ensured to save an amount of resins used and reduce manufacturing costs further. Besides., the film 6 interposed prevents the sheet 5 and the outside wall 2 being adhered directly to each other, so that, when the outside wall is damaged, leakage of dangerous substances can be found promptly.

Further, spacers 3 into which the sheet 5 and the film 6 are integrally formed may be used so that they can simply be so interposed between the inside wall 1 and the outside wall 2 as to cover the inside wall 1.

The spacers 3 each comprises a square-plate like sheet 5 having cavities 4 whose openings are directed toward the outside wall 2 and a film 6 covering the openings at the cavities 4 of the sheet 5 and stuck to the sheet 5. The spaces between the adjacent cavities 4 define the room for detecting leakage of dangerous substances.

Preferably, the spacers 3 are pre-formed in curves so as to have a curvature extending along a periphery of the inside wall 1, so as to be interposed between the inside wall 1 and the outside wall 2.

It is preferable that the cavities 4 at the sheet 5 are formed into the shapes as shown in FIG. 4. Also, in order to detect the leakage of dangerous substances promptly, it is advantageous that the sheet 5 is formed to have a height of the order of 3–5 mm so as not to broaden the intervals between adjacent cavities 4 too much and a thickness of the order of 0.4–1.2 mm allowing for pressure resistance strength.

The film 6 is stuck on an entire surface of the sheet 5 at the openings side of the cavities. Further, each spacer 3 is provided at the four marginal portions thereof with overlapping margins 9 so that it can overlap with adjacent spacers 3.

The spacers 3 are so placed as to cover the inside wall 1, as shown in FIG. 3, with the openings at the cavities of the sheet 5 confronting the outside wall 2 and the depressions at the cavities 4 of the sheet 5 confronting the inside wall 1.

The use of these spacers 3 for covering the inside wall 1 can provide the result that simply by disposing the spacers on the outer periphery of the inside wall 1, the room for detecting leakage of dangerous substance can be ensured and also the outside wall 2 can be formed at the time of producing the FRP double-wall tank. Thus, improved workability and productivity can be achieved, in comparison with the case where the sheet 5 and the film 6 are respectively interposed between the inside wall 1 and the outside wall 2, so that the FRP double-wall tank can be provided at reduced manufacturing costs.

Figure 6:
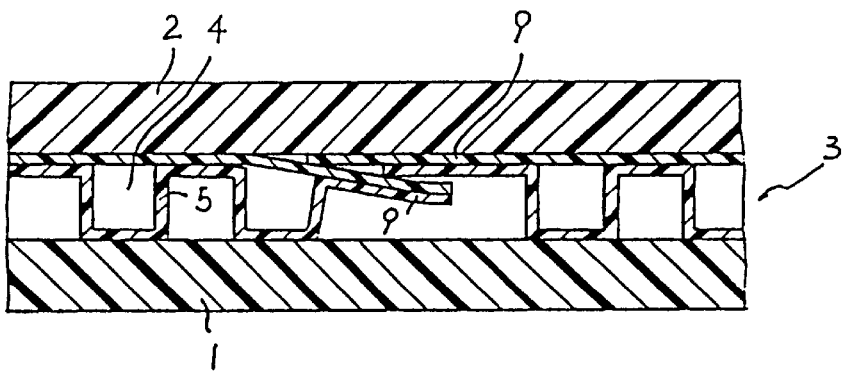
FIG. 6 shows a partial section view of the FRP double-wall tank showing an overlapping part of the spacer shown in FIG. 3 with an adjacent spacer at the overlapping margins.

Further, in this arrangement, when adjacent spacers 3 are overlapped with each other at the overlapping margins 9, as shown in FIG. 6, creation of gaps between the adjacent spacers 3 can be prevented to surely prevent resins entering the room for detecting leakage of dangerous substance in the molding of the outside wall 2.

Figure 5:
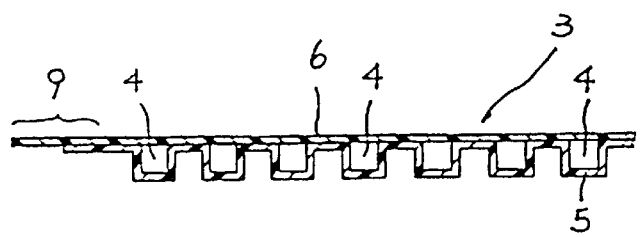
FIG. 5 shows a partial section view of a marginal portion of the spacer shown in FIG. 4.

In the embodiment, as shown in FIGS. 5 and 6, the end portion of the film 6 is extended beyond the end of the sheet 5 at the overlapping margins 9, so that the film 6 can overlap with the adjacent spacer 3 to extend near to a cavity at the adjacent spacer 3, so as to prevent the entry of resin more surely.

Figure 7:
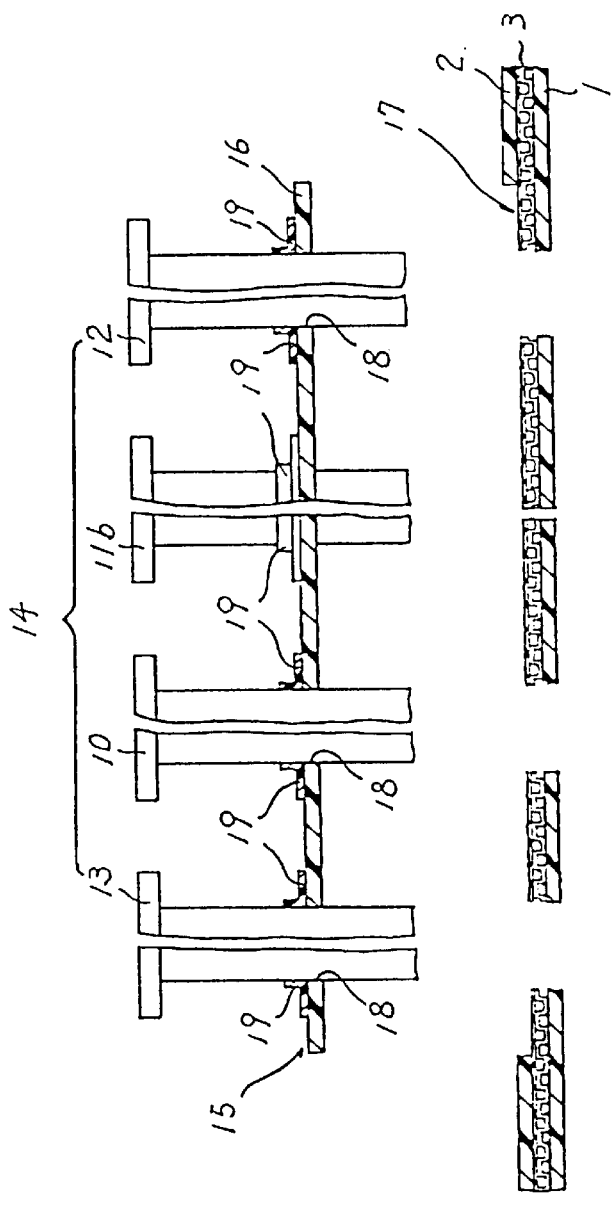
FIG. 7 shows a partial section view of a cutout plate of the outside wall through which nozzles are perforated.
Figure 8:
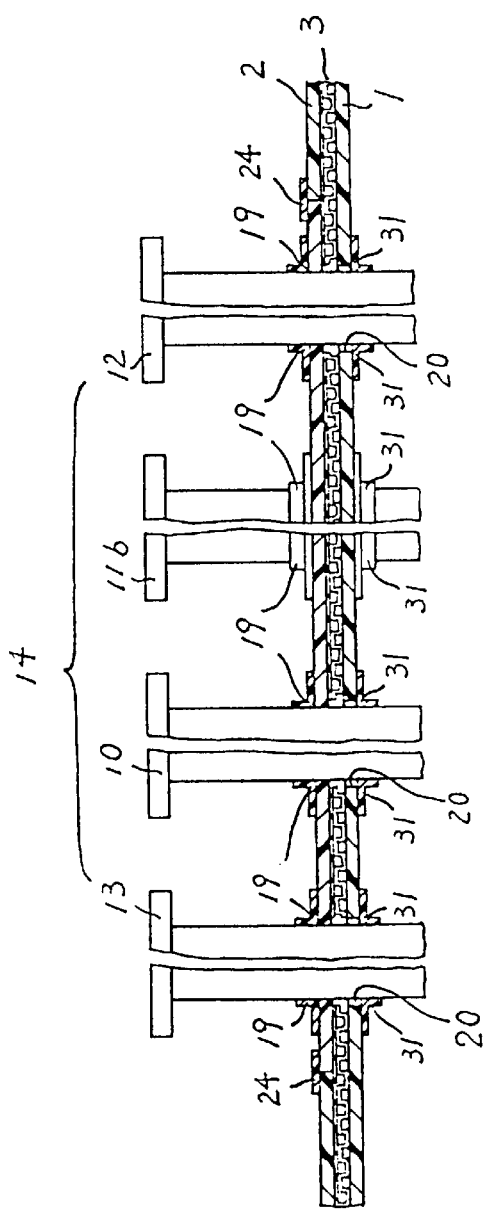
FIG. 8 shows a partial section view of the FRP double-wall tank showing that the cutout plate is restored to the remaining part of the outside wall.

Several kinds of nozzles 14 including an oiling nozzle 10, a ventilating nozzle 11*a*, a fueling nozzle 11*b*, an oil-level gauging nozzle 12, and a detecting nozzle 13, which extend through the inside wall 1 and the outside wall 2, are secured on an upper surface on the left side of the FRP double-wall tank as viewed in FIG. 1, as mentioned above. As shown in FIGS. 7 and 8, a part 15 of the outside wall 2 including the nozzle-inserting part is cut out from the outside wall 2 to make an outside-wall cutout plate 16. After the nozzles 14 are inserted into the cutout plate 16, the cutout plate 16 is restored to the remaining part of the outside wall 2.

More specifically, the part 15 of the outside wall 2 including the part through which the nozzles 14 shown in FIG. 1 extend is cut out as an outside-wall cutout plate 16. Then, the nozzles 14 are fixed to the outside-wall cutout plate 16. The fixture is made in the following order: First, the outside-wall cutout plate 16 is clamped with proper jigs and then is perforated to form through bores 18 for the nozzles 14. After the nozzles 14 are passed through the through bores 18, the outside-wall cutout plate 16 at the part around the nozzle-inserting part is united with the nozzles 14 by lamination to form overlays 19. This leads to the state as shown in FIG. 7. Then, the outside wall cutout plate 16 is restored to the remaining part 17 of the outside wall 2 or the opening part at the outside wall 2 which results from the cutout of the outside wall 2. This leads to the state shown in FIG. 8.

In the fixture of the outside-wall cutout plate 16 to the remaining part 17 of the outside wall 2, the nozzles 14 are passed through the through bores 20 formed in the inside wall 1. Then, the outside-wall cutout plate 16 is restored to the remaining part 17 of the outside wall 2 and the edge parts of the plate 16 and the related parts of the outside wall 2 are united by lamination and are bonded to each other by overlays 24 being formed. Gaps between the through bores 20 in the inside wall 1 and the nozzles 14 are filled by additional overlays 31 in order to keep hermeticity of the interior of the inside wall 1.

This way of fixing the nozzles 14 to the FRP double-wall tank enables the fixing work of the nozzles 14 to the tank to be simplified, in comparison with the way of fixing the nozzles 14 directly to the tank, in that the fixing work of the nozzles 14 can be done just on the outside-wall cutout plate 16 by using simple jigs and the like and that the nozzles 14 can be accurately positioned while determining the degree of verticality and horizontality to the tank and ensurely bonded to the cutout plate 16 at the part around the nozzles 14 while maintaining the set vertical and horizontal positions of the nozzles 14. This can provide the FRP double-wall tank having the nozzles which are positioned with accuracy to be fixed to the tank.

In place of this fixing way, another fixing way as shown in FIGS. 9 and 10 may be adopted. In this variant, the part 15 of the outside wall 2 including the nozzles-inserting part is cut out from the outside wall 2 to obtain the outside-wall cutout plate 16, while also a part 21 of the inside wall 1 including the nozzles-piercing part is cut out from the inside wall 1 to obtain an inside-wall cutout plate 22. After the nozzles 14 are inserted in the outside-wall cutout plate 16 and the inside-wall cutout plate 22, the cutout plates 16 and 22 are restored to the remaining part 17 of the outside wall 2 and the remaining part 23 of the inside wall 1, respectively.

More specifically, the outside-wall cutout plate 16 and the inside-wall cutout plate 22 are cut out simultaneously from the outside wall 2 and the inside wall 1, and with the both cutout plates 16,22 clamped with proper jigs, the through bores 18,20 for the nozzles 14 are formed simultaneously. After the nozzles 14 are inserted into the through bores 18,20, the parts around the nozzle-inserting parts of the outside-wall cutout plate 16 and the nozzles 14 are united with each other by lamination to form the overlays 25, and the parts around the nozzle-inserting parts of the inside-wall cutout plate 22 and the nozzles 14 are united with each other by lamination to form the overlays 26.

Thereafter, the outside-wall cutout plate 16 and the inside-wall cutout plate 22 to which the nozzles 14 are fixed (as shown in FIG. 9) are restored to the remaining part 17 of the outside wall 2 and the remaining part 23 of the inside wall 1, respectively. Then, the edge portions of the outside-wall cutout plate 16 and the outside wall 2 are united by lamination to form the overlays 25, and the edge portions of the inside-wall cutout plate 22 and the inside wall 1 are united by lamination to form the overlays 28 (as shown in FIG. 10).

Figure 11:
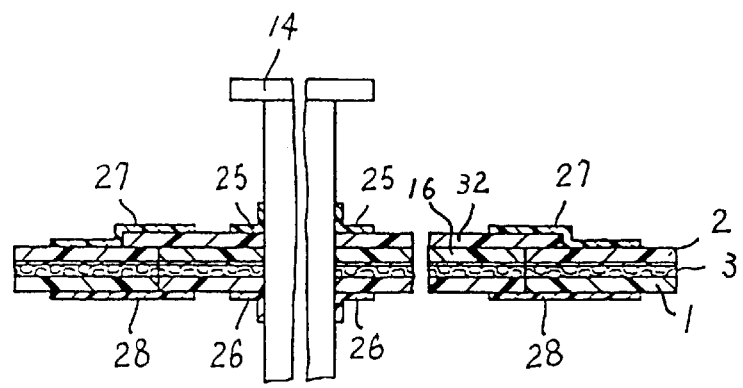
FIG. 11 shows a partial section view of the FRP double-wall tank showing the cutout plates and the outside wall fixed to each other by use of reinforcing plates.

Further, as shown in FIG. 11, a reinforcing plate 32 larger than the outside-wall cutout plate 16 may be fixed to the outside-wall cutout plate 16, so as to fix the outside-wall cutout plate 16 to the outside wall 2 via the reinforcing plate 32. The reinforcing plate 32 used is bored in advance at the places to attach the nozzles 14, and after the reinforcing plate 32 is attached to the outside wall, the outside wall 2 and the inside wall 1 are both bored. This enables the simple and precise boring. Further, the reinforcing plate 32 bonded to the outside-wall cutout plate 16 enables the bonded part to increase in strength.

In this embodiment, since the several nozzles 14 including the oiling nozzle 10, the ventilating nozzle 11*a*, the fueling nozzle 11*b*, the oil-level gauging nozzle 12, and the detecting nozzle 13 are attached to the outside-wall cutout plate 16 and the inside-wall cutout plate 22 simultaneously, the installation can be made with ease and also the degree of verticality and horizontality of the nozzles 14 to the tank can be determined with accuracy.

Figure 12:
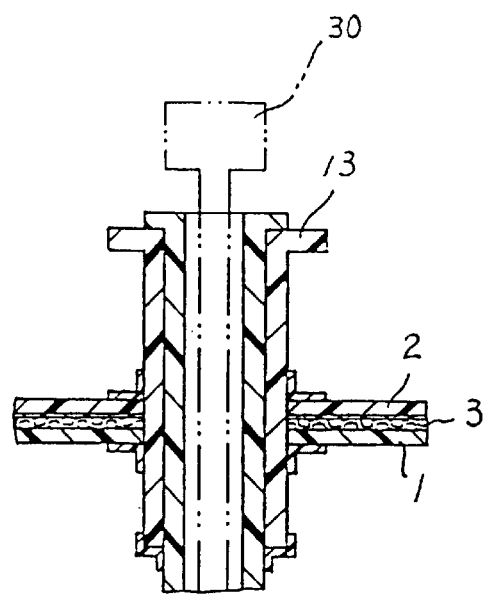
FIG. 12 shows a partial section view of the FRP double-wall tank showing placement of a detecting sensor.
Figure 12:
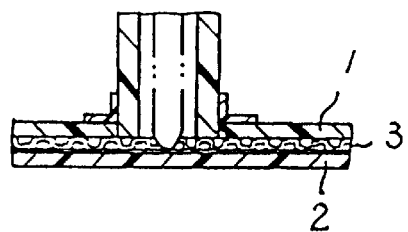

It is noted that a detecting sensor 30 is inserted and positioned in the detecting nozzle 13 of the nozzles 14, as shown in FIG. 12, so as to detect leakage of dangerous substances from the inside wall, if any.

Next, the method of producing the embodied FRP double-wall tank will be discussed below.

The FRP double-wall tank of the invention may be produced in known molding methods such as a filament winding method, a hand lay up method, spray up method, a sheet sticking method, and a centrifugal molding method. The filament winding method is desirable in that the inside wall 1 and the outside wall 2 are molded on a same mandrel in a simple and easy way.

One example as is molded in the filament winding method will be described below.

The inside wall 1 of reinforced plastics is molded in the filament winding method. Thermosetting resins, preferably, unsaturated polyester resins, vinyl ester resins and the like, are used for reinforced plastics of the inside wall 1. For unsaturated polyester resins any known resins may be used. Isophthalic acid resins, terephthalic acid resins and bisphenol resins are desirable in point of corrosion resistance.

Also, fiberglass is desirable for reinforced fiber in the reinforced plastics, and preferably, the fiberglass contains 30–60 wt % of reinforced plastics, though the glass content of the fiberglass is not specifically limited to this range.

The inside wall 1 is molded with the fiberglass wound on the mandrel in parallel, helical, polar, level, etc. in any known windings, and impregnated with the abovesaid thermosetting resins. In this process, chopped strand or chopped strand mat may be used together.

Then, the sheet 5 having cavities 4 are so placed on the molded inside wall 1 as to cover the inside wall 1, with the openings at the cavities 4 facing the outside wall 2, and the film 6 is so placed on the sheets 5 as to cover the sheets 5. When the sheets 5 are placed on the inside wall 1, it is preferable that the sheets 5 are so placed as to be jointed with each other and the film 6 is placed on the jointed sheets 5.

As a material for the sheet 5, known thermoplastic resins such as polystyrene, polyvinyl chloride, polymethacrylate resins, are used and are formed into a sheet in known sheet-molding methods such as a straight forming, a pressure forming, a plug assist forming, a drape forming, a pressure valve immersion forming. Then, the cavities 4 are formed on the sheet in a vacuum molding method and the like.

As a material for the film 6, any known resins such as polyethylene, polypropylene, polyethylene terephthalate, polyvinyliden chloride, may be used, unless they are dissolved in styrene monomer contained in the abovesaid unsaturated polyester resins or vinyl ester resins which are used for molding the inside wall 1 and the outside wall 2.

The outside wall 2 of reinforced plastics is formed on the film 6 in the filament winding method so as to cover the film 6.

The reinforced plastics which are molded into the inside wall 1 or equivalent may be used to mold the outside wall 2, and the outside wall 2 is molded in the same manner as the inside wall 1.

Instead of using the sheet 5 and the film 6 respectively, a plurality of spacers 3 comprising the sheets 5 having cavities 4 and the film 6 covering the openings at the cavities 4 of the sheets and bonded to the sheets 5 may be used. The spacers 3 can then be placed on the molded inside wall 1, with the film 6 facing outside and no gaps created between the spacers 3. Desirably, the film 6 of the spacers 3 are jointed with each other before the spacers 3 are placed on the inside wall 1.

The use of the spacers 3 not only can ensure the room for detecting leakage of dangerous substance but also can form the outside wall 2 at the time of producing the FRP double-wall tank, by simply disposed around the outer periphery of the inside wall 1. Thus, improved workability and productivity can be achieved, in comparison with the process in which the sheets 5 and the films 6 are respectively interposed between the inside wall 1 and the outside wall 2, so that the FRP double-wall tank can be provided at reduced manufacturing costs.

In this embodiment, when adjacent spacers are overlapped with each other at the overlapping margins 9 at the spacers 3, as shown in FIG. 6, that can prevent gaps being created between the adjacent spacers 3 to surely prevent resins entering the room for detecting leakage of dangerous substance in the step of molding the outside wall 2.

And, the outside wall 2 of reinforced plastics is formed on the films 6 of the spacers 3 covering the inside wall 1 in the filament winding method.

The FRP double-wall tank of the invention produced in this way is particularly suitable for use to a tank for storing dangerous substances like gasoline which is to be buried underground and is requested for corrosion resistance.

What is claimed is:

1. A fiber reinforced plastic double-wall tank comprising an inside wall of reinforced plastic, an outside wall of reinforced plastic covering said inside wall, and a set of spacers which are interposed between said inside wall and said outside wall as to cover said inside wall, each of said spacers comprising a sheet having cavities, openings of which are directed towards said outside wall, wherein the fiber reinforced plastic double-wall tank further comprises a film covering said openings at said cavities of said sheet and at least partially engaged to at least one of said sheets, wherein said spacers further comprise marginal portions, with adjacent spacers overlapping each other at the marginal portions.

2. The fiber reinforced plastic double-wall tank as set forth in claim 1 which is to be used as a tank to be buried underground.

3. An fiber reinforced plastic double wall tank structure, comprising, in combination:
   a) an inner tank formed at least partially of a reinforced plastic, with the inner tank having an outer wall;
   b) an outer tank formed at least partially of a reinforced plastic, with the outer tank having an inner wall, with the inner wall of the outer tank being spaced from the outer wall of the inner tank such that the tanks are spaced from each other; and
   c) a plastic sheet disposed between the tanks and having sections confronting each of the walls, with the plastic sheet comprising a matrix of elongate cavities such that fluid may flow in each of the elongate cavities in a direction parallel to the outer and inner walls; and
   d) wherein the plastic sheet comprises a pair of opposing edge portions and wherein the matrix of elongate cavities comprises a set of elongate cavities communicative with each other, with the set of elongate cavities having a first elongate cavity adjacent to one opposing edge portion and a second elongate cavity adjacent to the other opposing edge portion, with the opposing edge portions being staggered relative to each other.

4. A fiber reinforced plastic double wall tank structure, comprising, in combination:

a) an inner tank formed at least partially of a reinforced plastic, with the inner tank having an outer wall;

b) an outer tank formed at least partially of a reinforced plastic, with the outer tank having an inner wall, with the inner wall of the outer tank being spaced from the outer wall of the inner tank such that the tanks are spaced from each other; and c) a plastic sheet disposed between the tanks and having sections confronting each of the walls, with the plastic sheet comprising a matrix of elongate cavities such that fluid may flow in each of the elongate cavities in a direction parallel to the outer and inner walls; and d) wherein each of the elongate cavities includes opposite ends which are closed in the direction running parallel to the outer and inner tanks.

\* \* \* \* \*